United States Patent
Yogo et al.

(10) Patent No.: US 7,958,959 B2
(45) Date of Patent: Jun. 14, 2011

(54) MOUNTING STRUCTURE FOR A PART PROVIDED TO AN ENCLOSURE OF AN IN-WHEEL MOTOR

(75) Inventors: Shigekazu Yogo, Nagoya (JP); Ryoji Mizutani, Nishikamo-gun (JP); Yuki Tojima, Chita-gun (JP); Shuuetsu Suzuki, Gamagori (JP)

(73) Assignees: Toyota Jidosha Kabushiki Kaisha, Toyota (JP); Aisin Seiki Kabushiki Kaisha, Kariya-shi (JP)

( * ) Notice: Subject to any disclaimer, the term of this patent is extended or adjusted under 35 U.S.C. 154(b) by 983 days.

(21) Appl. No.: 11/579,417

(22) PCT Filed: May 16, 2005

(86) PCT No.: PCT/JP2005/009296
§ 371 (c)(1),
(2), (4) Date: Nov. 2, 2006

(87) PCT Pub. No.: WO2005/110796
PCT Pub. Date: Nov. 24, 2005

(65) Prior Publication Data
US 2008/0093133 A1    Apr. 24, 2008

(30) Foreign Application Priority Data
May 17, 2004   (JP) .................... 2004-146074

(51) Int. Cl.
*B60K 1/00*   (2006.01)
(52) U.S. Cl. ..................................... 180/65.51; 903/906

(58) Field of Classification Search ............... 180/65.51, 180/65.6
See application file for complete search history.

(56) References Cited

U.S. PATENT DOCUMENTS

| | | | | |
|---|---|---|---|---|
| 4,913,258 | A * | 4/1990 | Sakurai et al. ................ | 180/242 |
| 5,014,800 | A * | 5/1991 | Kawamoto et al. ......... | 180/65.51 |
| 5,087,229 | A * | 2/1992 | Hewko et al. ................. | 475/149 |
| 5,127,485 | A * | 7/1992 | Wakuta et al. ............. | 180/65.51 |
| 5,150,763 | A * | 9/1992 | Yamashita et al. ........... | 180/252 |
| 5,163,528 | A | 11/1992 | Kawamoto et al. | |
| 5,180,180 | A * | 1/1993 | Yamashita et al. ............ | 180/253 |
| 5,382,854 | A * | 1/1995 | Kawamoto et al. ......... | 310/67 R |
| 5,472,059 | A | 12/1995 | Schlosser et al. | |
| 6,113,119 | A * | 9/2000 | Laurent et al. ............. | 280/124.1 |
| 6,386,553 | B2 * | 5/2002 | Zetterstrom ................. | 280/5.51 |
| 6,540,632 | B1 * | 4/2003 | Wendl et al. ...................... | 475/5 |

(Continued)

FOREIGN PATENT DOCUMENTS
CH    691 052 A5    4/2001

(Continued)

OTHER PUBLICATIONS

U.S. Appl. No. 11/596,724, filed Nov. 16, 2006 in the name of Ryoji Mizutani et al.

(Continued)

*Primary Examiner* — Jeffrey J Restifo
(74) *Attorney, Agent, or Firm* — Oliff & Berridge, PLC

(57) ABSTRACT

A breather device provided on the outer peripheral section of a case of an in-wheel motor is located at a position above the rotation shaft of the in-wheel motor, between the in-wheel motor and a wheel. The position is inside the wheel in the width direction of a vehicle.

21 Claims, 7 Drawing Sheets

U.S. PATENT DOCUMENTS

| | | | |
|---|---|---|---|
| 6,722,459 B1* | 4/2004 | Wendl et al. | 180/65.51 |
| 6,732,827 B2 | 5/2004 | San Miguel | |
| 6,752,227 B1* | 6/2004 | Bachmann | 180/65.51 |
| 6,866,114 B1 | 3/2005 | Villeneuve | |
| 6,942,049 B2 | 9/2005 | Shimizu | |
| 7,118,119 B2 | 10/2006 | Amanuma | |
| 7,121,367 B2* | 10/2006 | Ajiro et al. | 180/65.51 |
| 7,216,731 B2* | 5/2007 | Kakinami et al. | 180/65.51 |
| 7,228,928 B2* | 6/2007 | Mizutani et al. | 180/65.51 |
| 7,243,749 B2* | 7/2007 | Kakinami et al. | 180/65.51 |
| 7,306,065 B2* | 12/2007 | Nagaya | 180/65.51 |
| 7,320,376 B2* | 1/2008 | Kurata | 180/65.51 |
| 7,347,295 B2* | 3/2008 | Kurata | 180/65.51 |
| 7,350,605 B2* | 4/2008 | Mizutani et al. | 180/65.51 |
| 7,420,301 B2* | 9/2008 | Veny et al. | 310/75 C |
| 7,527,113 B2* | 5/2009 | Jenkins | 180/65.51 |
| 7,641,010 B2* | 1/2010 | Mizutani et al. | 180/65.51 |
| 2004/0080223 A1* | 4/2004 | Shimizu | 310/75 C |
| 2005/0056471 A1* | 3/2005 | Kurata | 180/65.5 |
| 2007/0068715 A1* | 3/2007 | Mizutani et al. | 180/65.5 |
| 2008/0289891 A1* | 11/2008 | Yogo et al. | 180/65.5 |
| 2009/0101425 A1* | 4/2009 | Laurent | 180/65.51 |
| 2010/0051365 A1* | 3/2010 | DeVeny et al. | 180/65.51 |

FOREIGN PATENT DOCUMENTS

| | | |
|---|---|---|
| EP | 1 362 736 A1 | 11/2003 |
| EP | 1 547 843 A1 | 6/2005 |
| JP | A-04-185263 | 7/1992 |
| JP | A 04-185263 | 7/1992 |
| JP | A-04-185531 | 7/1992 |
| JP | A 04-185531 | 7/1992 |
| JP | A 04-185532 | 7/1992 |
| JP | A-04-185532 | 7/1992 |
| JP | A 05-104960 | 4/1993 |
| JP | A-05-104960 | 4/1993 |
| JP | A 7-81430 | 3/1995 |
| JP | A 08-149753 | 6/1996 |
| JP | A-08-149753 | 6/1996 |
| JP | A-08-168226 | 6/1996 |
| JP | A 08-168226 | 6/1996 |
| JP | A-9-132040 | 5/1997 |
| JP | A-09-142160 | 6/1997 |
| JP | A 09-142160 | 6/1997 |
| JP | A 9-195744 | 7/1997 |
| JP | A 9-263144 | 10/1997 |
| JP | A 2000-224884 | 8/2000 |
| JP | A-2000-299956 | 10/2000 |
| JP | A 2000-299956 | 10/2000 |
| JP | A-2001-032914 | 2/2001 |
| JP | A 2001-032914 | 2/2001 |
| JP | A 2001-173762 | 6/2001 |
| JP | A-2001-173762 | 6/2001 |
| JP | A 2001-327111 | 11/2001 |
| JP | A 2002-068022 | 3/2002 |
| JP | A-2002-068022 | 3/2002 |
| JP | A-2002-135907 | 5/2002 |
| JP | A 2002-135907 | 5/2002 |
| JP | A 2002-225646 | 8/2002 |
| JP | A 2002-252944 | 9/2002 |
| JP | A 2002-252955 | 9/2002 |
| JP | A 2003-211979 | 7/2003 |
| JP | A 2004-90696 | 3/2004 |
| JP | A-2004-090793 | 3/2004 |
| JP | A 2004-090793 | 3/2004 |
| JP | 2004-120911 | 4/2004 |
| JP | A 2004-114858 | 4/2004 |
| JP | A 2004-120911 | 4/2004 |
| JP | A 2004-122953 | 4/2004 |
| JP | A-2005-081871 | 3/2005 |
| WO | WO 02/083446 A1 | 10/2002 |
| WO | WO 03/106207 A1 | 12/2003 |

OTHER PUBLICATIONS

U.S. Patent and Trademark Office Rejection, mailed Apr. 1, 2009 in U.S. Appl. No. 12/222,030.

U.S. Patent and Trademark Office Final Rejection/ Notice of Appeal, mailed Nov. 12, 2009 in U.S. Appl. No. 12/222,030.

Japanese Patent Office communication, mailed Jun. 10, 2008 in Japanese Patent Application No. 2004-146074.

Office Action issued in U.S. Appl. No. 12/222,030; mailed Apr. 13, 2010.

Office Action issued in U.S. Appl. No. 12/222,030 on Sep. 27, 2010.

Apr. 21, 2011 Office Action issued in German Application No. 11 2005 001 122.4 (with translation).

* cited by examiner

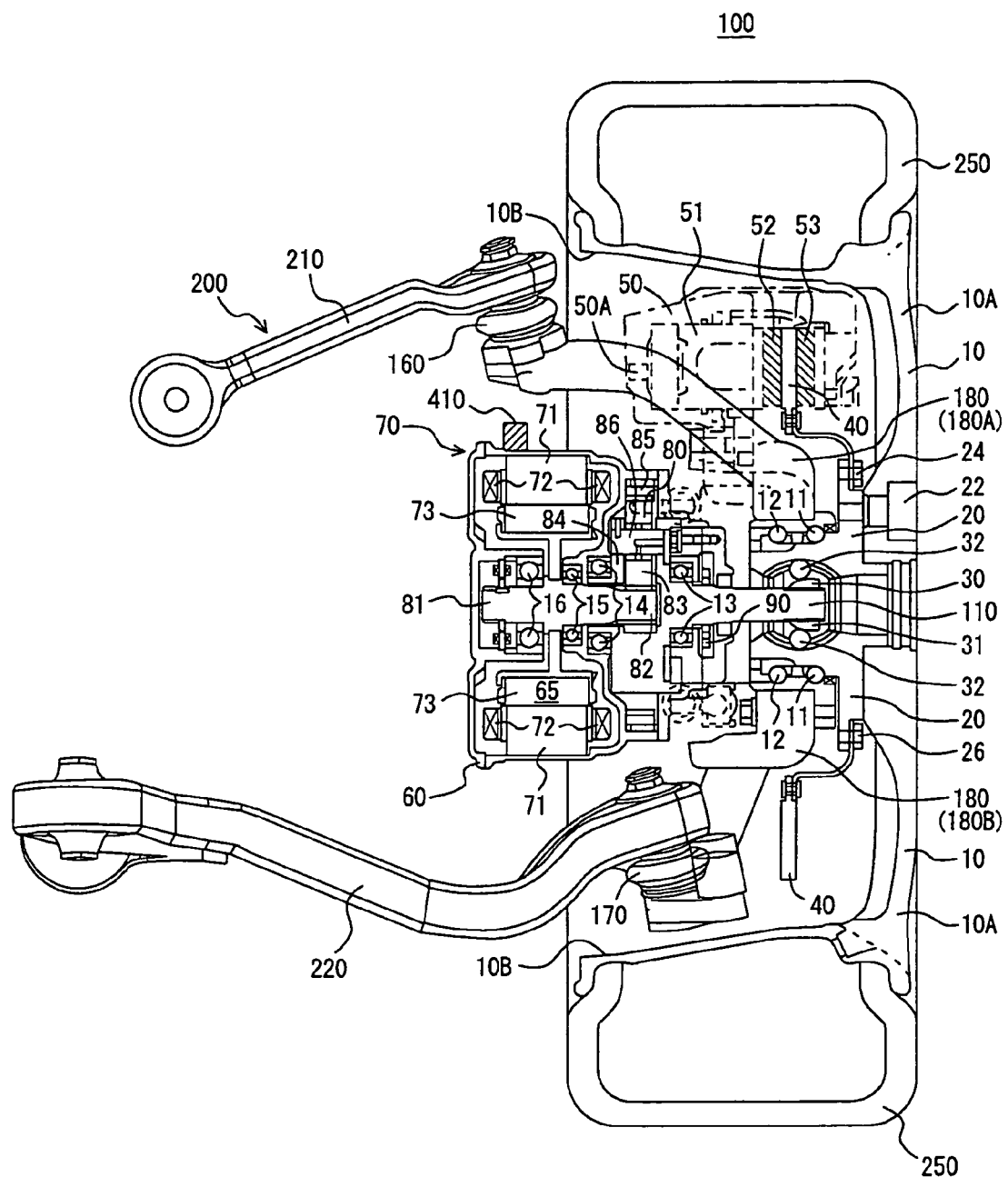
F I G . 4

FRONT SIDE OF VEHICLE ←

LINE OF WHEEL END FACE 420
470
460
70

FIG. 7B ↑

UPPER SIDE OF VEHICLE 420
460
480

ROTATION SHAFT OF MOTOR

MOUNTING STRUCTURE FOR A PART PROVIDED TO AN ENCLOSURE OF AN IN-WHEEL MOTOR

TECHNICAL FIELD

The present invention relates to a mounting structure of a part, and particularly to a mounting structure of a part provided on an outer peripheral section of an enclosure of an in-wheel motor.

BACKGROUND ART

Conventionally, in a vehicle having an in-wheel motor wherein the motor for generating driving force is provided in the wheel, a part such as a breather device maintaining a pressure within an enclosure of the motor at a constant level or a connector connected to a sensor detecting a temperature or the number of revolutions of the motor is provided on the outer peripheral section of the enclosure. For example, as a part provided at the enclosure of the in-wheel motor, a device detecting a fault of a magnetic detection sensor is disclosed in the following publication.

Japanese Patent Laying-Open No. 2000-224884 discloses a compact and lightweight detecting device capable of detecting a fault. This detecting device magnetically detects the rotation angle of the motor. The detecting device includes three or more magnetic detection sensors that are arranged at prescribed electrical angles and detect intensity of the magnetic field in a binary manner, an inverting device that inverts the output of at least one of the magnetic detection sensors, and an output device that outputs a sensor error when the outputs of all the magnetic detection sensors are equal.

According to the detecting device disclosed in the above-described publication, the output of one of the magnetic detection sensors is inverted to prevent the outputs of all the magnetic detection sensors from becoming identical. Thus, it can be determined, when detecting equal outputs from the magnetic detection sensors, that there is a fault of the detecting device, break of a cable of the detecting device, disconnection of a connector, or the like.

However, in the in-wheel motor, if a high power output is demanded for the motor or a so-called dynamic mass damper mechanism supporting the motor by a resilient member is provided to improve riding comfort of the vehicle, the structure of the in-wheel motor would increase in size. In such a case, the axial length of the motor may become greater than a width of the wheel, causing the enclosure of the motor to protrude from the wheel toward the inner side of the vehicle. If the above-described breather device, the connector provided for the sensor, or the detecting device disclosed in the above-described publication is provided at the region of the enclosure of the motor protruding from the wheel, flying stones kicked up by the wheel may bounce off the inner surface of the wheel house, and hit the above-described part to cause damage thereto.

DISCLOSURE OF THE INVENTION

An object of the present invention is to provide a mounting structure of a part that prevents damage due to collision of flying stones kicked up by a wheel.

A mounting structure of a part according to an aspect of the present invention is a mounting structure of a part that is provided on an outer peripheral section of an enclosure of an in-wheel motor having a motor generating driving force of a wheel arranged in the wheel. The motor has an axial length longer than a width of the wheel. The part is located at a position above a rotation shaft of the motor and between the motor and the wheel. The position is inside the wheel in a width direction of a vehicle.

According to the invention, when the motor has an axial length longer than the width of the wheel, a part (e.g., breather device) is arranged at a position above the rotation shaft of the motor, between the motor and the wheel. The position is inside the wheel in the width direction of the vehicle. When the motor is driven and the vehicle enters the running state, the wheel kicks up stones, sand, dust and other foreign substances scattered on the road surface (hereinafter, such stones, sand, dust and other foreign substances will be referred to as "flying stones") along with rotation. At this time, the wheel kicks up the flying stones toward the back of the wheel. The flying stones kicked up by the wheel bounce off the inner surface of the wheel house. Of the flying stones having bounced off the inner surface of the wheel house, those flying toward the part will hit the wheel, because the part is arranged between the wheel and the motor. That is, the wheel itself protects the part from collision of the flying stones. Accordingly, it is possible to provide a mounting structure of a part that prevents damage due to collision of flying stones kicked up by a wheel.

A mounting structure of a part according to another aspect of the present invention is a mounting structure of a part, provided on an outer peripheral section of an enclosure of an in-wheel motor having a motor generating driving force of a wheel in the wheel. The motor has an axial length longer than a width of the wheel. The part is located at a position above a rotation shaft of the motor and on a front side of a vehicle. The position is outside the wheel in a width direction of the vehicle.

According to the invention, when the motor has an axial length longer than the width of the wheel, a part (e.g., breather device) is arranged at a position above the rotation shaft of the motor, on the front side of the vehicle. The position is outside the wheel in the width direction of the vehicle. When the motor is driven to cause the vehicle to run, the wheel kicks up flying stones along with rotation. At this time, the wheel kicks up the flying stones toward the back of the wheel. The flying stones kicked up by the wheel bounce off the inner surface of the wheel house. The flying stones having bounced off the inner surface of the wheel house hit the enclosure of the motor at its region closer to the rear side of the vehicle compared to the rotation shaft of the motor. That is, by mounting the part on the enclosure at its region closer to the front side of the vehicle compared to the rotation shaft of the motor, collision of the flying stones can be prevented even at the region protruding from the wheel toward the inner side of the vehicle. Accordingly, it is possible to provide a mounting structure of a part that prevents damage due to collision of flying stones kicked up by a wheel.

A mounting structure of a part according to yet another aspect of the present invention is a mounting structure of a part, provided on an outer peripheral section of an enclosure of an in-wheel motor having a motor generating driving force of a wheel in the wheel. The motor has an axial length longer than a width of the wheel. The part is located at a position above a rotation shaft of the motor and on a rear side of a vehicle. The position is outside the wheel in a width direction of the vehicle. The part has a shield unit provided closer to the center of the vehicle in the width direction compared to the part and closer to the rear side compared to the part, and preventing a contact with a foreign substance from the outside.

According to the invention, when the motor has an axial length longer than the width of the wheel, a part (e.g., breather device) is arranged at a position above the rotation shaft of the motor, on the rear side of the vehicle. The position is outside the wheel in the width direction of the vehicle. The part has a shield unit (for example, a shield plate) provided closer to the center of the vehicle in the width direction compared to the part and closer to the rear side compared to the part, and preventing a contact with a foreign substance like a flying stone kicked up by the wheel. When the motor is driven to cause the vehicle to run, the wheel kicks up flying stones along with rotation. At this time, the wheel kicks up the flying stones toward the back of the wheel. The flying stones kicked up by the wheel bounce off the inner surface of the wheel house. Of the flying stones having bounced off the inner surface of the wheel house, those flying toward the part will hit the shield plate provided at the enclosure of the motor. That is, the shield plate can prevent the flying stones from hitting the part. Accordingly, it is possible to provide a mounting structure of a part that prevents damage due to collision of flying stones kicked up by a wheel.

Preferably, the part is a breather device provided at the motor.

According to the invention, the part is the breather device provided at the motor. The breather device is provided to maintain the pressure inside the motor at a constant level. For example, the breather device is provided above the rotation shaft of the motor, between the motor and the wheel. The breather device is provided such that its position in the width direction of the vehicle is inside the wheel. This can prevent a contact with the flying stones that are kicked up with the rotation of the wheel and bounce off the inner surface of the wheel house to fly off. That is, it is possible to prevent damage to the breather device.

Further, preferably, the position of the part corresponds to the position where oil discharged from the breather device would not adhere to a brake provided inside the wheel.

According to the invention, the position of the part is the position where the oil discharged from the breather device would not adhere to the brake provided inside the wheel. This can prevent a decrease in friction resistance, i.e., degradation of braking force, attributable to the oil adherent to the brake.

Further, preferably, the part is a connector provided for a sensor detecting a state of the motor.

According to the invention, the part is a connector provided for the sensor detecting a state of the motor. For example, the connector is arranged above the rotation shaft of the motor, between the motor and the wheel. The connector is provided such that its position in the width direction of the vehicle is inside the wheel. This can prevent a contact with the flying stones that are kicked up with the rotation of the wheel and bounce off the inner surface of the wheel house to fly off. That is, damage to the connector can be prevented.

Further, preferably, the sensor is a sensor detecting the number of revolutions of the motor.

According to the invention, the sensor is a sensor detecting the number of revolutions of the motor. By arranging the connector provided for the sensor detecting the number of revolutions of the motor in such a manner to prevent a contact with the flying stones kicked up by the wheel, it is possible to prevent damage to the connector provided at the enclosure of the motor.

Further, preferably, the sensor is a sensor detecting a temperature of the motor.

According to the invention, the sensor is a sensor detecting the temperature of the motor. By arranging the connector provided for the sensor detecting the temperature of the motor in such a manner to prevent a contact with the flying stones kicked up by the wheel, it is possible to prevent damage to the connector provided at the enclosure of the motor.

Further, preferably, the wheel is provided with a resilient member attached to the motor and damping vibration of the wheel and the motor, and a rotary support member connected to an output shaft of the motor and rotatably supporting the wheel. The resilient member is attached to the rotary support member.

According to the invention, the wheel is provided with a resilient member attached to the motor and damping vibration of the wheel and the motor, and a rotary support member (e.g., knuckle) connected to the output shaft of the motor and rotatably supporting the wheel. The resilient member is attached to the knuckle. When the in-wheel motor has a so-called dynamic damper mechanism that supports the motor by a resilient member, the structure of the motor would increase in size. Even in the event that a certain region of the enclosure of the motor protrudes from the wheel toward the inner side of the vehicle with the increase in size of the motor structure, damage to the part (e.g., breather device) provided at the enclosure of the motor can be prevented by arranging the part in such a manner to avoid a contact with the flying stones kicked up by the wheel.

BRIEF DESCRIPTION OF THE DRAWINGS

FIG. 4 is a diagram showing a cross section of a wheel support device according to a second embodiment.

FIGS. 7A and 7B are diagrams showing a configuration of a shield plate according to the third embodiment.

BEST MODES FOR CARRYING OUT THE INVENTION

Figure 1:
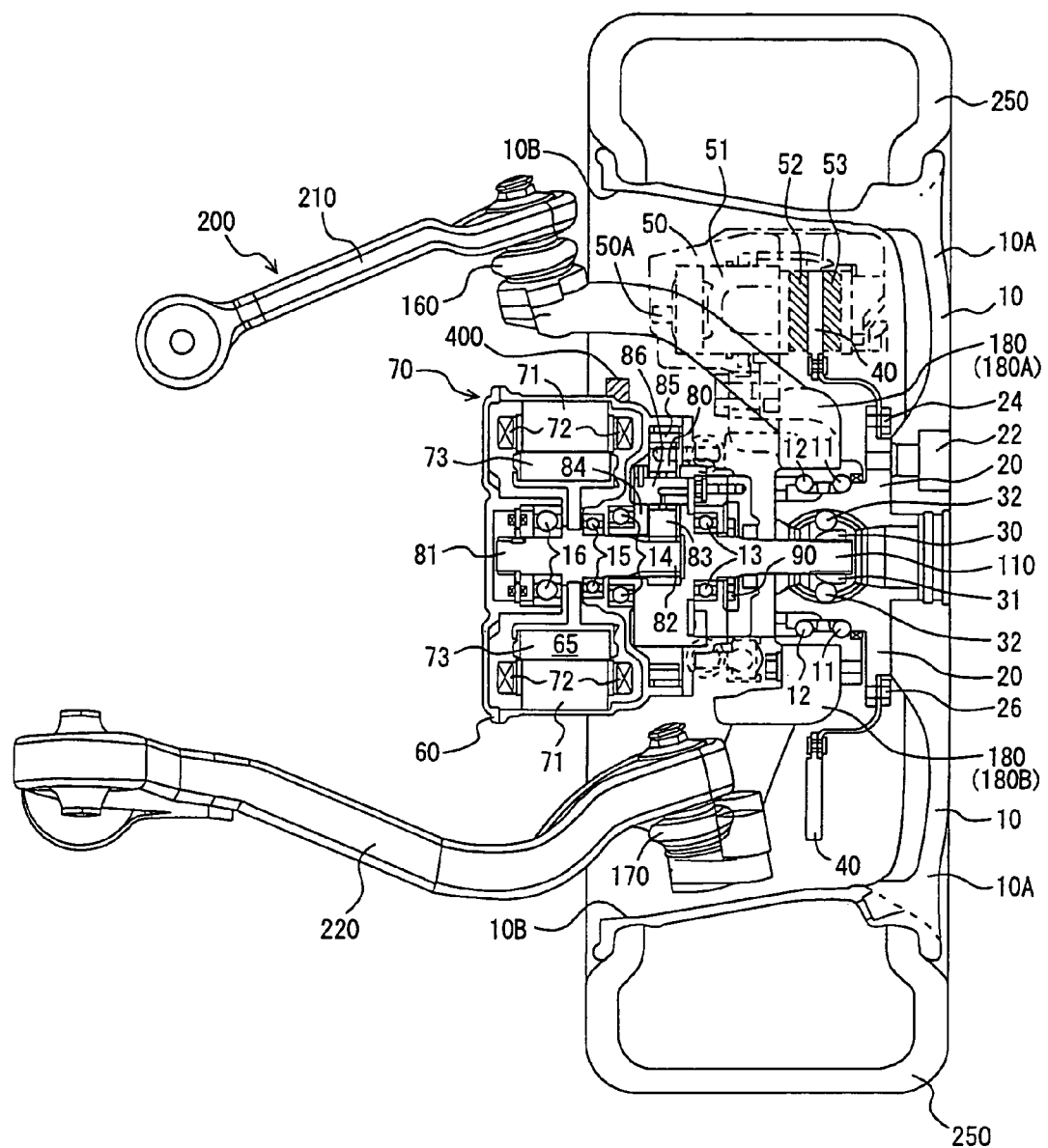
FIG. 1 is a (first) diagram showing a cross section of a wheel support device according to a first embodiment.

Hereinafter, mounting structures of a part according to embodiments will be described with reference to the drawings. In the following, the same parts have the same reference characters allotted, and their names and functions are also the same. Therefore, detailed description thereof will not be repeated.

To describe the mounting structures of a part according to the embodiments, firstly, description will be made about a configuration of a motor-driven wheel having an in-wheel motor generating driving force of a vehicle to which a part is provided, and a wheel support device supporting the motor-driven wheel, according to the embodiments.

First Embodiment

As shown in FIG. 1, a motor-driven wheel 100 supported by a wheel support device 200 according to a first embodiment of the present invention is formed with a wheel disk 10, a wheel hub 20, a constant velocity joint 30, a brake rotor 40, a brake caliper 50, an in-wheel motor 70, and a tire 250.

In-wheel motor 70 is formed with a case 60, a motor 65, a planetary gear 80, an oil pump 90, a shaft 110, and an oil passage (not shown).

Wheel support device 200 is formed with a dynamic mass damper mechanism (not shown), ball joints 160, 170, a knuckle 180, an upper arm 210, a lower arm 220, and a shock absorber (not shown).

Wheel disk 10 has an approximately cup shape, and is formed with a disk portion 10A and a rim portion 10B. Wheel disk 10 may be configured to accommodate wheel hub 20, brake rotor 40, brake caliper 50, and in-wheel motor 70. Wheel disk 10 is coupled to wheel hub 20 by fastening disk portion 10A to wheel hub 20 by a bolt or a nut (not shown) at a wheel attachment portion 22. Wheel hub 20 contains constant velocity joint 30 therein, and is coupled to shaft 110 via constant velocity joint 30 thus contained. Wheel hub 20 is rotatably supported by knuckle 180 via bearings 11, 12. Tire 250 is secured to an outer edge of rim portion 10B of wheel disk 10.

Constant velocity joint 30 includes an inner 31 and balls 32. Inner 31 is fitted to shaft 110. Balls 32 mate with a groove of wheel hub 20 and a groove of inner 31 provided in the direction of the rotational axis of shaft 110, and cause wheel hub 20 to rotate in association with rotation of shaft 110. Further, balls 32 are movable in the direction of the rotational axis of shaft 110 along the grooves provided at wheel hub 20 and inner 31. It is noted that constant velocity joint 30 is not particularly restricted, as long as it constitutes a motive power transmitting mechanism that transmits motive power of in-wheel motor 70 to wheel 10. For example, a so-called flexible coupling may be used, wherein a plurality of disks and the like are used to connect the in-wheel motor side and the wheel side in a manner allowing eccentricity in any direction.

Brake rotor 40 is arranged such that its inner peripheral end is secured to an outer peripheral end of wheel hub 20 by bolts 24, 26, and its outer peripheral end passes through brake caliper 50. Brake caliper 50 is secured to knuckle 180. Brake caliper 50 includes a brake piston 51 and brake pads 52, 53. The outer peripheral end of brake rotor 40 is sandwiched between brake pads 52, 53.

When brake oil is supplied from an opening 50A, brake piston 51 moves to the right in the paper plane of FIG. 1, to press brake pad 52 to the right in the paper plane. When brake pad 52 is moved to the right in the paper plane by brake piston 51, in response, brake pad 53 moves to the left in the paper plane. As such, brake pads 52, 53 pinch the outer peripheral end of brake rotor 40, whereby the brake is applied to motor-driven wheel 100.

Case 60 is arranged to the left of wheel hub 20 in the paper plane of FIG. 1. Case 60 accommodates motor 65, planetary gear 80, oil pump 90, shaft 110, and the oil passage.

Motor 65 includes a stator core 71, a stator coil 72, and a rotor 73. Stator core 71 is secured to case 60. Stator coil 72 is wound around stator core 71. When motor 65 is a three-phase motor, stator coil 72 is composed of U-phase coil, V-phase coil and W-phase coil. Rotor 73 is arranged on the inner peripheral side of stator core 71 and stator coil 72.

Planetary gear 80 includes a sun gear shaft 81, a sun gear 82, a pinion gear 83, a planetary carrier 84, a ring gear 85, and a pin 86. Sun gear shaft 81 is coupled to rotor 73 of motor 65. Sun gear shaft 81 is rotatably supported by bearings 15, 16. Sun gear 82 is coupled to sun gear shaft 81.

Pinion gear 83 mates with sun gear 82, and is rotatably supported by a bearing arranged on the outer periphery of pin 86. Planetary carrier 84 is coupled to pinion gear 83, and is connected to shaft 110. Planetary carrier 84 and shaft 110 connected to planetary carrier 84 are rotatably supported by bearings 13, 14. Ring gear 85 is secured to case 60. Pin 86 is supported at planetary carrier 84.

Oil pump 90 is provided at an end of in-wheel motor 70 on the wheel hub 20 side, while being connected to shaft 110. Shaft 110 is connected to inner 31 of constant velocity joint 30 and to planetary carrier 84, as described above, and is rotatably supported by bearings 13, 14.

The oil passage is provided at case 60. The oil passage has one end coupled to oil pump 90 and the other end inserted into an oil sump (not shown).

Oil pump 90 pumps up, via the oil passage, the oil accumulated in the oil sump in association with rotation of shaft 110, and circulates the pumped-up oil within case 60. A breather device 400 is provided at the upper part of case 60, which maintains the pressure within case 60 at a constant level.

Figure 2:
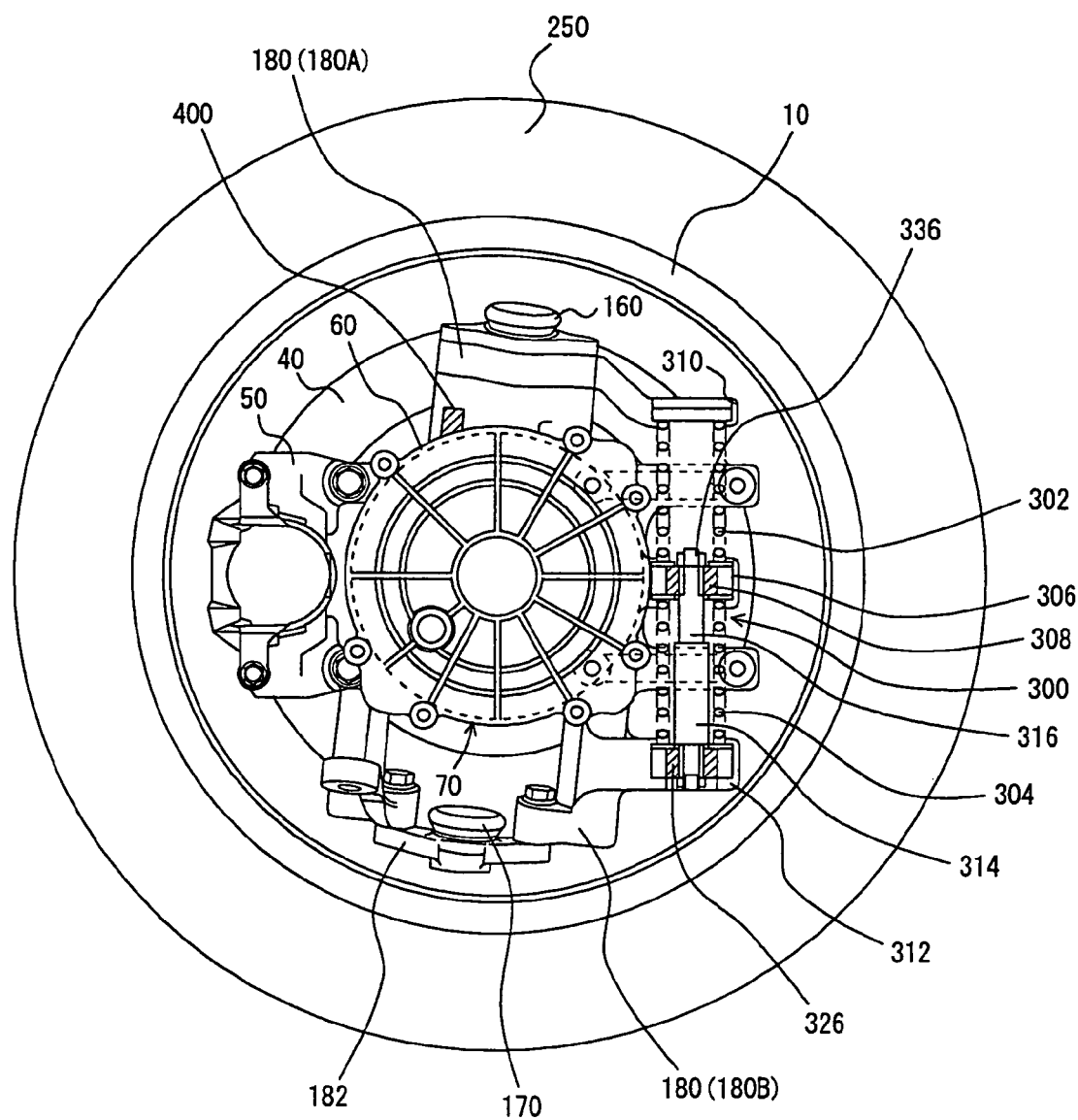
FIG. 2 is a diagram showing an appearance of the wheel support device of the first embodiment as seen from the direction of the rotation shaft of the motor.

As shown in FIG. 2, dynamic mass damper mechanism 300 is formed with springs 302, 304 identified as a pair of resilient members provided in the up-and-down direction of the vehicle. Dynamic mass damper mechanism 300 has its center part 306 attached to the outer peripheral side surface of case 60 of in-wheel motor 70. In the present embodiment, for example, center part 306 of dynamic mass damper mechanism 300 is attached to case 60 at a position on the rear side of the vehicle and at the same level as the rotation shaft of in-wheel motor 70. Dynamic mass damper mechanism 300 has its upper part 310 connected to knuckle 180 (180A). Upper part 310 and center part 306 are connected via spring 302. Dynamic mass damper mechanism 300 has its lower part 312 connected to knuckle 180 (180B). Lower part 312 and center part 306 are connected via spring 304.

Lower part 312 and center part 306 are also connected via an absorber 314. Absorber 314 includes a shaft 316. Absorber 314 restricts vertical vibration of shaft 316. Shaft 316 has one end 336 connected to center part 306. Shaft 316, penetrating through center part 306, has its horizontal position restricted by a bushing 308. A lower end of absorber 314 has its horizontal position restricted by a bushing 326. It is noted that end 336 of shaft 316 may be connected to upper part 310.

Knuckle 180 (180A) has one end coupled to ball joint 160 and the other end coupled to wheel hub 20 via bearings 11, 12. At the bottom of knuckle 180 (180B), a plate 182 is secured by a bolt. Ball joint 170 is coupled to plate 182.

Figure 3:
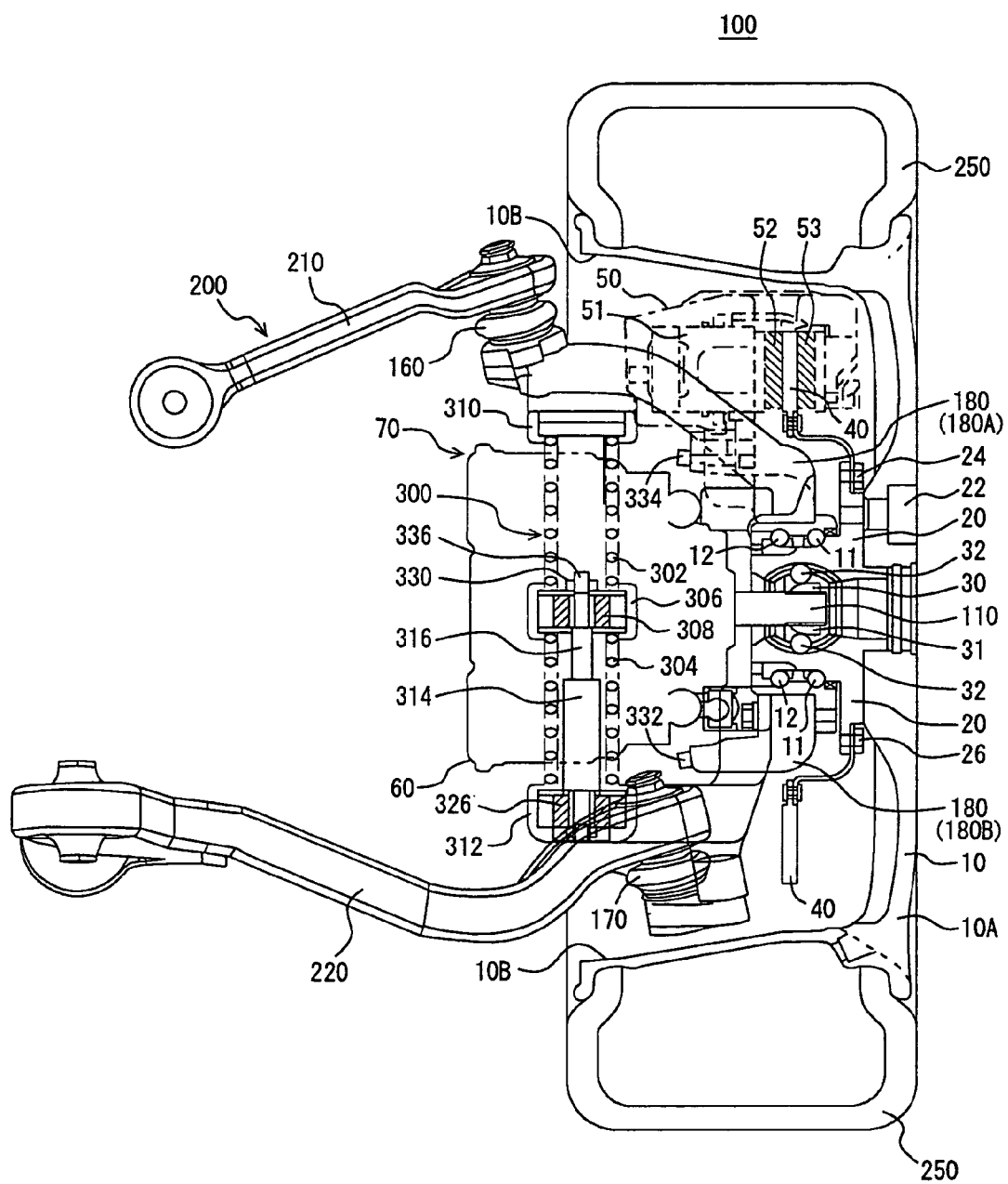
FIG. 3 is a (second) diagram showing a cross section of the wheel support device of the first embodiment.

As shown in FIG. 3, upper arm 210 and lower arm 220 are arranged in the up-and-down direction of the vehicle. Upper arm 210 has one end coupled to ball joint 160, and the other end secured to the vehicle body in a manner allowing turning in the up-and-down direction of the vehicle. Lower arm 220 has one end coupled to ball joint 170, and the other end secured to the vehicle body in a manner allowing turning in the up-and-down direction of the vehicle. Further, lower arm 220 is coupled to the vehicle via a shock absorber. As such, motor-driven wheel 100 is suspended from the vehicle.

In this manner, upper arm 210 and lower arm 220 are coupled to knuckle 180 via ball joints 160 and 170, respectively, from the upper and lower directions of the vehicle.

Knuckle 180 is coupled with one end of a steering tie rod (not shown). The steering tie rod turns motor-driven wheel 100 to the right or left with respect to the traveling direction of the vehicle, in accordance with the turning force from the steering (steering wheel) of the vehicle.

Since upper arm 210 and lower arm 220 are secured to the vehicle in a manner allowing turning in the up-and-down direction of the vehicle, and lower arm 220 is coupled to the vehicle via the shock absorber, upper arm 210, lower arm 220 and the shock absorber function as suspension.

Dynamic mass damper mechanism 300 is secured to case 60 of in-wheel motor 70. Dynamic mass damper mechanism 300 is also coupled to knuckle 180. Wheel support device 200 supports motor-driven wheel 100 on the vehicle by coupling the suspension arms (upper arm 210 and lower arm 220) to knuckle 180 via ball joints 160 and 170.

More specifically, wheel support device 200 rotatably supports wheel disk 10 and wheel hub 20 by means of upper arm 210, lower arm 220 and knuckle 180, and supports in-wheel motor 70 in a manner allowing vibration in the up-and-down direction of the vehicle by means of upper arm 210, lower arm 220 and dynamic mass damper mechanism 300.

Further, when an alternating current is supplied to stator coil 72 by a switching circuit (not shown) incorporated in the vehicle, rotor 73 rotates, and motor 65 outputs prescribed torque. The output torque of motor 65 is transmitted via sun gear shaft 81 to planetary gear 80. Planetary gear 80 uses sun gear 82 and pinion gear 83 to change the output torque received from sun gear shaft 81, i.e., changes (reduces) the speed, and outputs the resultant torque to planetary carrier 84. Planetary carrier 84 transmits the output torque of planetary gear 80 to shaft 110, and shaft 110 rotates wheel hub 20 and wheel disk 10 at a prescribed revolution speed via constant velocity joint 30. This causes motor-driven wheel 100 to rotate at the prescribed revolution speed, so that the vehicle runs.

During the running of the vehicle, when motor-driven wheel 100 receives vibration in the up-and-down direction of the vehicle in response to the road conditions and the like, springs 302, 304 of dynamic mass damper mechanism 300 extend and retract in the up-and-down direction of the vehicle by in-wheel motor 70 that serves as a damper mass. With extension and retraction of springs 302, 304, there occurs vibration in the up-and-down direction of in-wheel motor 70 that is out of phase with the vibration due to the force received from the road surface by motor-driven wheel 100. That is, dynamic mass damper mechanism 300 converts the vibration of motor-driven wheel 100 to the vibration of in-wheel motor 70. At this time, vibration as a combination of the vibration of motor-driven wheel 100 and the vibration of in-wheel motor 70 out of phase with the vibration of motor-driven wheel 100 is transmitted to the vehicle. Since the vibration of motor-driven wheel 100 and the vibration of in-wheel motor 70 are out of phase, the amplitude of the vibration of motor-driven wheel 100 is decreased by the amplitude of the vibration of in-wheel motor 70 that is out of phase. In other words, with the vibration of in-wheel motor 70, the vibration of motor-driven wheel 100 becomes less likely to be transmitted to the vehicle via upper arm 210 and lower arm 220.

In-wheel motor 70 vibrates in the up-and-down direction via constant velocity joint 30. More specifically, in-wheel motor 70 vibrates, with constant velocity joint 30 as the center of rotation, to draw an arc in the up-and-down direction of the vehicle. At this time, the vibration of in-wheel motor 70 in the horizontal direction is absorbed by bushings 308 and 326 provided at dynamic mass damper mechanism 300. Meanwhile, the vibration of in-wheel motor 70 in the up-and-down direction caused by extension and retraction of spring 304 is damped by absorber 314.

As described above, the input from tire 250 to the unsprung components is alleviated. More specifically, when motor-driven wheel 100 receives vibration during the running of the vehicle in accordance with the road conditions and the like, the vibration that cannot be absorbed by the shock absorber provided at the suspension is absorbed by dynamic mass damper mechanism 300. Dynamic mass damper mechanism 300 causes in-wheel motor 70 to vibrate in the up-and-down direction of the vehicle by the vibration received by motor-driven wheel 100, with the phase being shifted. Eventually, dynamic mass damper mechanism 300 does not transmit large vibration to the vehicle body which is sprung. This leads to improvement in riding comfort of the vehicle incorporating the wheel driven by in-wheel motor 70.

During the running of the vehicle, tire 250 rotates with the driving of in-wheel motor 70, and kicks up stones, sand, dust and other foreign substances scattered on the road surface. The flying stones thus kicked up may bounce off the inner surface of the wheel house provided on the vehicle body side and then may hit in-wheel motor 70. Particularly, in-wheel motor 70 provided with dynamic mass damper mechanism 300 has the motive power transmitting mechanism like constant velocity joint 30, so that the axial length of in-wheel motor 70 may exceed the width of wheel 10. This may cause part of case 60 to protrude from wheel 10 toward the center of the vehicle. In this case, the flying stones having bounced off the inner surface of the wheel house would hit the region of case 60 protruding toward the center of the vehicle. At this time, if the part to be provided at case 60 is placed on the region of case 60 protruding toward the center of the vehicle, then the part may be damaged by the flying stones having bounced off the inner surface of the wheel house.

In view of the foregoing, in the mounting structure of a part according to the present embodiment, the part to be provided at case 60 is located at a position above the rotation shaft of in-wheel motor 70 and between in-wheel motor 70 and wheel 10. The position is inside the wheel 10 in the width direction of the vehicle. The part for which the mounting structure of a part of the present embodiment is applied is not particularly restricted, as long as it is provided at case 60. For example, it may be a breather device 400 that maintains the pressure inside the case 60 at a constant level.

When case 60 having oil circulated therein is sealed, the pressure inside the case 60 may not be constant, due to an influence of heat and the like. For example, if heat is generated inside case 60, or the case is externally heated, the gas such as the air within the case is warmed. The gas inside case 60 expands when warmed, and the pressure inside case 60 increases with the expansion of the gas. If the state of high pressure is maintained, the oil sealed inside case 60 may leak from the seal portion. Thus, breather device 400 is provided at the upper portion of case 60, which releases the pressure inside case 60 to maintain the pressure at a constant level. It is desirable that breather device 400 is provided preferably above the rotation shaft of in-wheel motor 70 to suppress leakage of the oil within case 60.

It is noted that wheel disk 10 and wheel hub 20 constitute the "wheel". Knuckle 180 constitutes the "rotary support member" that rotatably supports the wheel (wheel disk 10 and wheel hub 20). Springs 302, 304 each constitute the "resilient member" that damps vibrations of the wheel (wheel disk 10 and wheel hub 20) and in-wheel motor 70.

The function of the mounting structure of a part according to the present embodiment based on the above-described structure will now be described.

When in-wheel motor 70 is driven, the vehicle enters the running state. At this time, flying stones scattered on the road surface are kicked up with the rotation of tire 250. Specifically, tire 250 kicks up the flying stones toward the rear side of the vehicle. The flying stones thus kicked up bounce off the inner surface of the wheel house. Some of the kicked-up stones fly in the direction of breather device 400. The stones flying toward breather device 400 hit tire 250, since breather device 400 is arranged between wheel 10 and in-wheel motor 70. The flying stones that have hit tire 250 drop to the road surface, without hitting breather device 400.

As described above, according to the mounting structure of a part of the present embodiment, when the motor has an axial length longer than the width of the wheel, the breather device is arranged at a position above the rotation shaft of the motor, between the motor and the wheel. The position is inside the wheel in the width direction of the vehicle. When the motor is driven to cause the vehicle to run, the wheel kicks up the flying stones along with rotation. At this time, the wheel kicks up the flying stones toward the back of the wheel. The flying stones kicked up by the wheel bounce off the inner surface of the wheel house. Of the flying stones having bounced off the inner surface of the wheel house, those flying toward the breather device hit the wheel, because the breather device is arranged between the wheel and the motor. That is, the wheel itself protects the breather device from collision of the flying stones. Accordingly, it is possible to provide a mounting structure of a part that prevents damage due to collision of flying stones kicked up by a wheel.

Although breather device 400 has been described above as the part according to the present embodiment, the part is not particularly restricted, as long as it is provided at case 60. For example, it may be a connector connected to a sensor detecting a temperature, i.e., a so-called thermistor, or a sensor detecting the number of revolutions of in-wheel motor 70, i.e., a so-called resolver, provided inside in-wheel motor 70.

Further, it is preferable that breather device 400 is arranged at a position at which the oil discharged from breather device 400 would not adhere to brake caliper 50 or brake disk 40. In doing so, it is possible to prevent a decrease in friction resistance of brake pads 52, 53, i.e., degradation of braking force, that would occur when the oil discharged from breather device 400 adheres to brake caliper 50 or brake rotor 40.

Second Embodiment

Hereinafter, a mounting structure of a part according to a second embodiment of the present invention will be described. Compared to the configuration of motor-driven wheel 100 provided with breather device 400 according to the first embodiment described above, the mounting structure of a part according to the present embodiment differs in that a breather device 410 is arranged at a position different from that of breather device 400. Otherwise, the configuration is identical to the configuration of motor-driven wheel 100 provided with breather device 400 of the first embodiment described above. They are denoted by the same reference characters and their functions are also identical. Therefore, detailed description thereof will not be repeated here.

Figure 5:
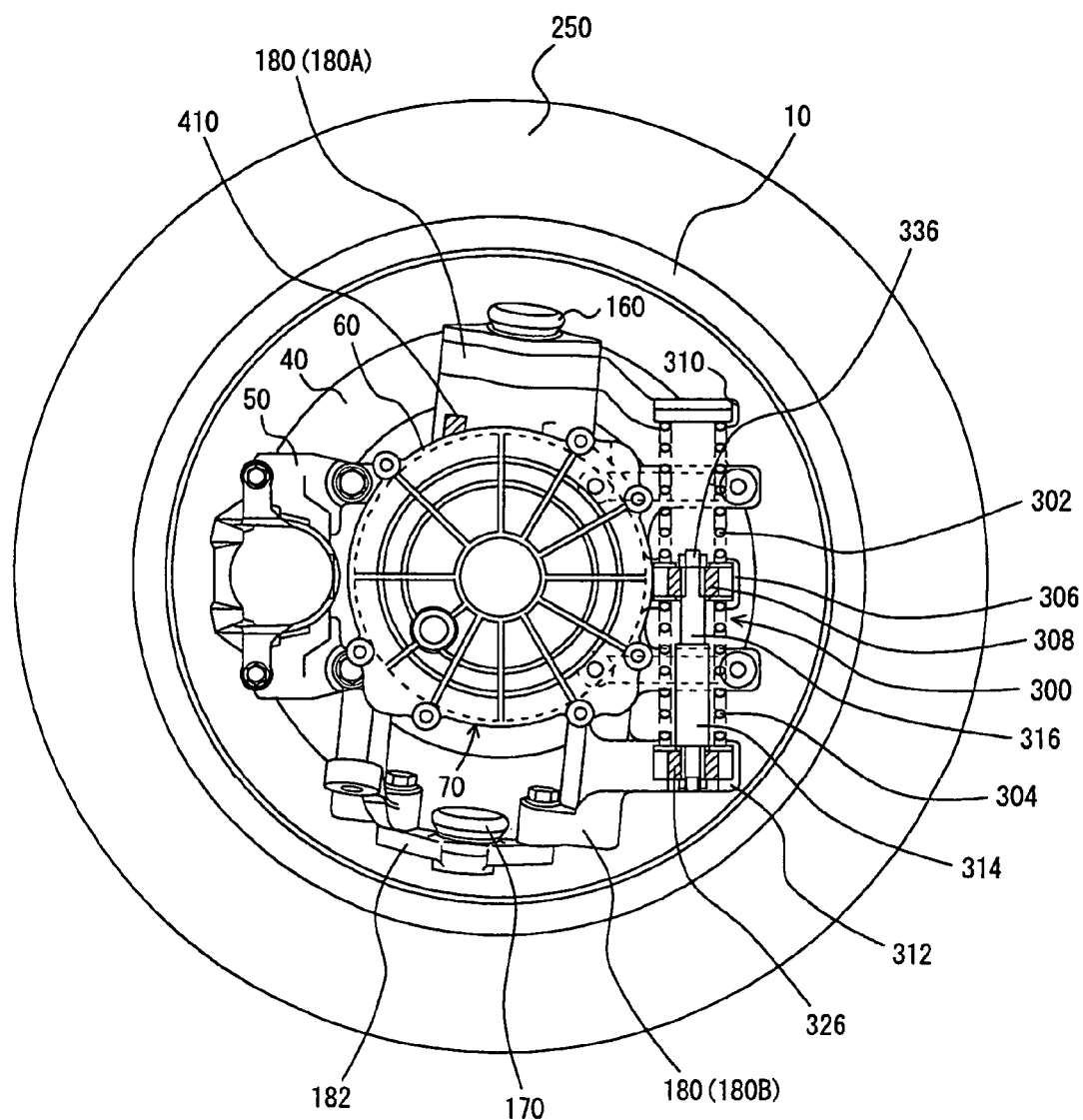
FIG. 5 is a diagram showing an appearance of the wheel support device of the second embodiment as seen from the direction of the rotation shaft of the motor.

As shown in FIG. 4, the breather device 410 according to the present embodiment is arranged such that its position in the width direction of the vehicle is outside the wheel 10. Further, as shown in FIG. 5, breather device 410 is located at a position above the rotation shaft of in-wheel motor 70 and on the front side of the vehicle.

The function of the mounting structure of a part according to the present embodiment based on the above-described structure will now be described.

When in-wheel motor 70 is driven, the vehicle enters the running state. At this time, flying stones scattered on the road surface are kicked up with the rotation of tire 250. Specifically, tire 250 kicks up the flying stones toward the rear side of the vehicle. The flying stones thus kicked up bounce off the inner surface of the wheel house. The kicked-up stones hit the region of in-wheel motor 70 protruding toward the inner side of the vehicle, at the position closer to the rear side of the vehicle compared to the rotation shaft of in-wheel motor 70. The flying stones that have hit in-wheel motor 70 drop to the road surface. That is, the flying stones drop to the road surface, without hitting breather device 410 arranged closer to the front side of the vehicle compared to the rotation shaft of in-wheel motor 70.

As described above, according to the mounting structure of a part of the present embodiment, when the motor has an axial length longer than the width of the wheel, the breather device is arranged at a position above the rotation shaft of the motor, on the front side of the vehicle. The position is outside the wheel in the width direction of the vehicle. When the motor is driven and the vehicle enters the running state, the wheel kicks up flying stones along with rotation. At this time, the wheel kicks up the flying stones toward the back of the wheel. The flying stones kicked up by the wheel bounce off the inner surface of the wheel house. The flying stones having bounced off the inner surface of the wheel house hit the enclosure of the motor at its region closer to the rear side of the vehicle compared to the rotation shaft of the motor. That is, by mounting the breather device closer to the front side of the vehicle compared to the rotation shaft of the motor, collision of the flying stones can be prevented even at the region of the motor that protrudes from the wheel toward the inner side of the vehicle. Accordingly, it is possible to provide a mounting structure of a part that prevents damage due to collision of flying stones kicked up by a wheel.

Third Embodiment

Hereinafter, a mounting structure of a part according to a third embodiment of the present invention will be described. Compared to the configuration of motor-driven wheel 100 provided with breather device 410 according to the second embodiment described above, the mounting structure of a part according to the present embodiment differs in that a breather device is arranged at a position different from that of breather device 410 in the front-and-rear direction of the vehicle, and in that the breather device is provided with a shield plate. Otherwise, the configuration is identical to the configuration of motor-driven wheel 100 provided with breather device 410 according to the second embodiment described above. They are denoted by the same reference characters, and their functions are also identical. Thus, detailed description thereof will not be repeated here.

Figure 6:
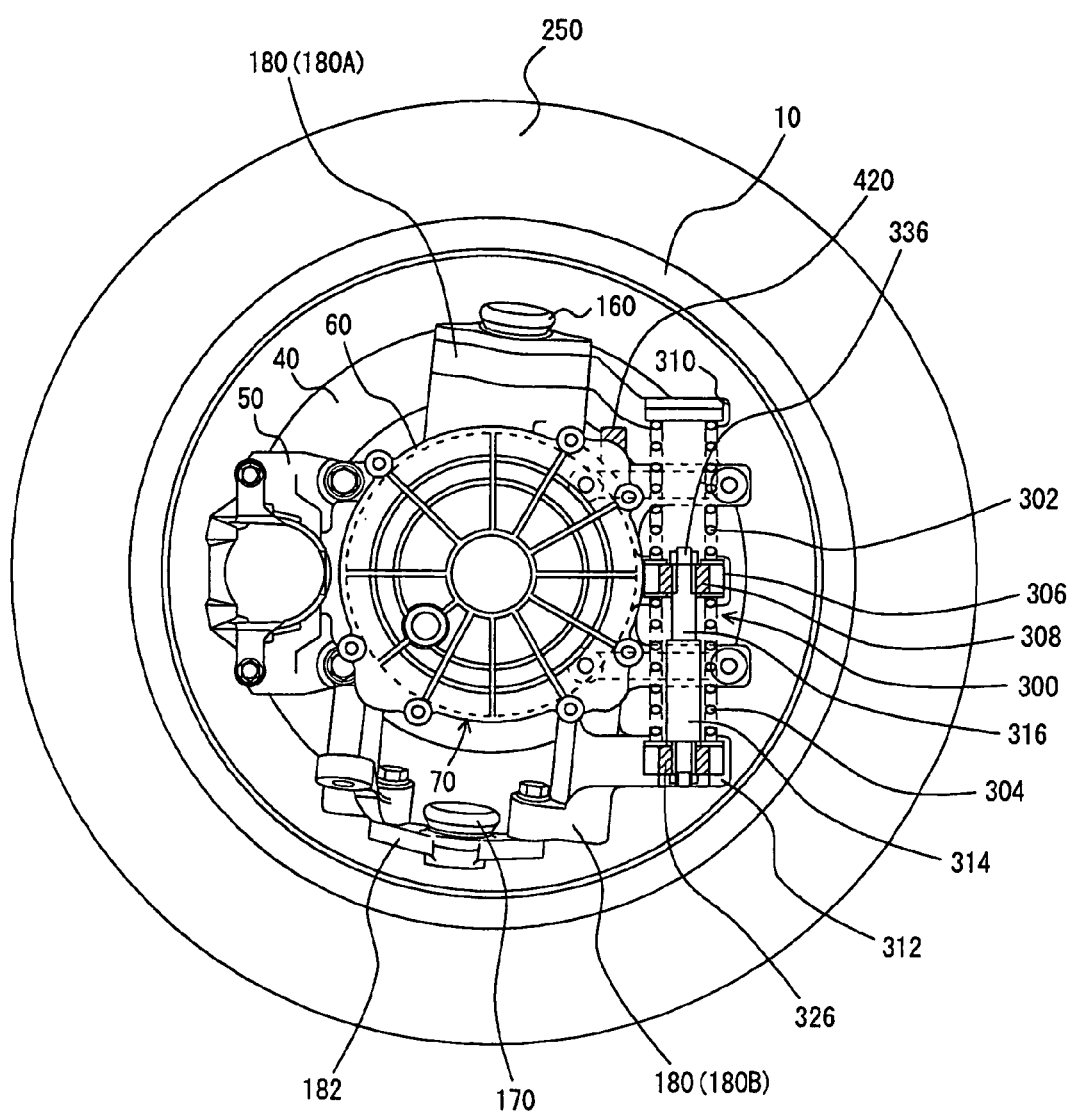
FIG. 6 is a diagram showing an appearance of a wheel support device according to a third embodiment as seen from the direction of the rotation shaft of the motor.
Figure 7A:
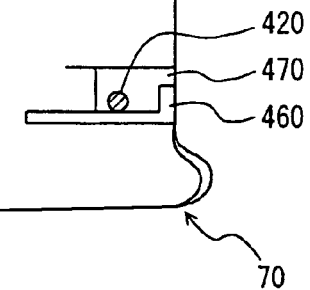
Figure 7A:
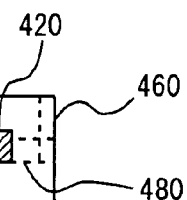

As shown in FIG. 6, the breather device 420 according to the present embodiment is arranged at a position above the rotation shaft of in-wheel motor 70 and on the rear side of the vehicle. Further, breather device 420 is arranged such that its position in the width direction of the vehicle is outside the wheel 10. As shown in FIGS. 7A and 7B, breather device 420 is provided with a shield plate 460 for preventing a contact with an external foreign substance, which is arranged closer to the center of the vehicle in the width direction of the vehicle compared to breather device 420 and closer to the rear side compared to breather device 420. Shield plate 460 is not particularly restricted, as long as it is a member in the shape capable of preventing a contact of breather device 420 with the external foreign substance.

The function of the mounting structure of a part according to the present embodiment based on the above-described structure will now be described.

When in-wheel motor 70 is driven, the vehicle enters the running state. At this time, flying stones scattered on the road surface are kicked up with the rotation of tire 250. Specifically, tire 250 kicks up the flying stones toward the rear side of the vehicle. The flying stones thus kicked up bounce off the inner surface of the wheel house. Some of the flying stones that have bounced off the inner surface of the wheel house fly in the direction of breather device 420. The stones flying toward breather device 420 hit shield plate 460. The flying stones that have hit shield plate 460 drop to the road surface without hitting breather device 420.

It is noted that shield plate 460 surrounding breather device 420 is preferably provided with a notch portion 470 on the rear side of the vehicle. This can suppress accumulation of the flying stones and/or water in an attachment portion 480 at which breather device 420 is provided, and thus can prevent degradation in function of breather device 420.

Further, it is desirable that notch portion 470 is provided at a location shifted (offset) from breather device 420 in the width direction of the vehicle. This can prevent the stones flying toward the rear side of the vehicle from passing through notch portion 470 and hitting breather device 420.

As described above, according to the mounting structure of a part of the present embodiment, when the motor has an axial length longer than the width of the wheel, the breather device is arranged at a position above the rotation shaft of the motor, on the rear side of the vehicle. The position is outside the wheel in the width direction of the vehicle. The breather device has a shield plate provided closer to the center of the vehicle in the width direction compared to the breather device and closer to the rear side compared to the breather device, and preventing a contact with a foreign substance like a flying stone kicked up by the wheel. When the motor is driven and the vehicle enters the running state, the wheel kicks up flying stones along with rotation. At this time, the wheel kicks up the flying stones toward the back of the wheel. The flying stones kicked up by the wheel bounce off the inner surface of the wheel house. Of the flying stones having bounced off the inner surface of the wheel house, those flying toward the breather device hit the shield plate provided at the motor. That is, the shield plate can prevent the flying stones from hitting the breather device. Accordingly, it is possible to provide a mounting structure of a part that prevents damage due to collision of flying stones kicked up by a wheel.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A breather device mounted to an in-wheel motor, the combination comprising:
the breather device provided on an outer peripheral section of an enclosure of the in-wheel motor, the motor generating a driving force of a wheel and being located in the wheel, the motor having an axial length longer than a width of the wheel wherein:
the breather device is located at a position above a rotation shaft of the motor and between the motor and the wheel,
the position is inside the width of the wheel, and
the breather device is provided at the motor.

2. The breather device mounted to an in-wheel motor according to claim 1, wherein the position corresponds to a position where oil discharged from the breather device does not adhere to a brake provided inside the wheel.

3. The breather device mounted to an in-wheel motor according to claim 1, wherein
the wheel is provided with a resilient member attached to the motor and damping vibration of the wheel and the motor, and a rotary support member connected to an output shaft of the motor and rotatably supporting the wheel, and
the resilient member is attached to the rotary support member.

4. A connector mounted to an in-wheel motor, the combination comprising:
the connector provided on an outer peripheral section of an enclosure of the in-wheel motor, the motor generating a driving force of a wheel and being located in the wheel, the motor having an axial length longer than a width of the wheel wherein:
the connector is located at a position above a rotation shaft of the motor and between the motor and the wheel,
the position is inside the width of the wheel, and
the connector provided for a sensor detecting a state of the motor.

5. The connector mounted to an in-wheel motor according to claim 4, wherein the sensor is a sensor detecting the number of revolutions of the motor.

6. The connector mounted to an in-wheel motor according to claim 4, wherein the sensor is a sensor detecting a temperature of the motor.

7. A breather device mounted to an in-wheel motor, the combination comprising:
the breather device provided on an outer peripheral section of an enclosure of an in-wheel motor, the motor generating a driving force of a wheel and being located in the wheel, the motor having an axial length longer than a width of the wheel wherein:
the breather device is located at a position above a rotation shaft of the motor and on a front side of a vehicle,
the position is outside the width of the wheel, and
the breather device is provided at the motor.

8. The breather device mounted to an in-wheel motor according to claim 7, wherein the position corresponds to a position where oil discharged from the breather device does not adhere to a brake provided inside the wheel.

9. A connector mounted to an in-wheel motor, the combination comprising:
the connector provided on an outer peripheral section of an enclosure of an in-wheel motor, the motor generating a driving force of a wheel and being located in the wheel, the motor having an axial length longer than a width of the wheel wherein:
the connector is located at a position above a rotation shaft of the motor and on a front side of a vehicle,
the position is outside the width of the wheel, and the connector provided for a sensor detecting a state of the motor.

10. The connector mounted to an in-wheel motor according to claim 9, wherein the sensor is a sensor detecting the number of revolutions of the motor.

11. The connector mounted to an in-wheel motor according to claim 9, wherein the sensor is a sensor detecting a temperature of the motor.

12. A breather device mounted to an in-wheel motor, the combination comprising:
the breather device provided on an outer peripheral section of an enclosure of an in-wheel motor, the motor generating a driving force of a wheel and being located in the wheel, the motor having an axial length longer than a width of the wheel wherein:
the breather device is located at a position above a rotation shaft of the motor and on a rear side of a vehicle,
the position is outside the width of the wheel, and the breather device has shield means, provided closer to a center of the vehicle, in a width direction, compared to the breather device and closer to the rear side compared to the breather device, for preventing a contact with a foreign substance from outside the breather device, and the breather device provided at the motor.

13. The breather device mounted to an in-wheel motor according to claim 12, wherein the position corresponds to a position where oil discharged from the breather device does not adhere to a brake provided inside the wheel.

14. A connector mounted to an in-wheel motor, the combination comprising:
the connector provided on an outer peripheral section of an enclosure of an in-wheel motor, the motor generating a driving force of a wheel and being located in the wheel, the motor having an axial length longer than a width of the wheel wherein:
the connector is located at a position above a rotation shaft of the motor and on a rear side of a vehicle,
the position is outside the width of the wheel,
the connector has shield means, provided closer to a center of the vehicle, in a width direction, compared to the connector and closer to the rear side compared to the connector, for preventing a contact with a foreign substance from outside the connector, and the connector provided for a sensor detecting a state of the motor.

15. The connector mounted to an in-wheel motor according to claim 14, wherein the sensor is a sensor detecting the number of revolutions of the motor.

16. The connector mounted to an in-wheel motor according to claim 14, wherein the sensor is a sensor detecting a temperature of the motor.

17. A breather device mounted to an in-wheel motor, the combination comprising:
the breather device provided on an outer peripheral section of an enclosure of an in-wheel motor, the motor generating a driving force of a wheel and being located in the wheel, the motor having an axial length longer than a width of the wheel wherein:
the breather device is located at a position above a rotation shaft of the motor and on a rear side of a vehicle,
the position is outside the width of the wheel, and
the breather device has a shield unit, provided closer to a center of the vehicle, in a width direction, compared to the breather device and closer to the rear side compared to the breather device, and preventing a contact with a foreign substance from the outside the breather device,
the breather device is provided at the motor.

18. The breather device mounted to an in-wheel motor according to claim 17, wherein the position corresponds to a position where oil discharged from the breather device does not adhere to a brake provided inside the wheel.

19. A connector mounted to an in-wheel motor, the combination comprising:
the connector provided on an outer peripheral section of an enclosure of an in-wheel motor, the motor generating a driving force of a wheel and being located in the wheel, the motor having an axial length longer than a width of the wheel wherein:
the connector is located at a position above a rotation shaft of the motor and on a rear side of a vehicle,
the position is outside the width of the wheel, and
the connector has a shield unit, provided closer to a center of the vehicle, in a width direction, compared to the connector and closer to the rear side compared to the connector, and preventing a contact with a foreign substance from the outside the connector, the connector is provided for a sensor detecting a state of the motor.

20. The connector mounted to an in-wheel motor according to claim 19, wherein the sensor is a sensor detecting the number of revolutions of the motor.

21. The connector mounted to an in-wheel motor according to claim 19, wherein the sensor is a sensor detecting a temperature of the motor.

* * * * *